(12) United States Patent
Carnevali

(10) Patent No.: US 7,802,832 B2
(45) Date of Patent: Sep. 28, 2010

(54) RECONFIGURABLE CONSOLE MOUNT HAVING A PLURALITY OF INTERCHANGEABLE TONGUE-AND-GROOVE BLANK AND EQUIPMENT MOUNTING PANELS AND QUICK DISCONNECT CLAMPS

(76) Inventor: Jeffrey D. Carnevali, 5957 Beach Dr. SW., Seattle, WA (US) 98136

( * ) Notice: Subject to any disclaimer, the term of this patent is extended or adjusted under 35 U.S.C. 154(b) by 65 days.

(21) Appl. No.: 12/287,622

(22) Filed: Oct. 10, 2008

(65) Prior Publication Data

US 2010/0090486 A1    Apr. 15, 2010

(51) Int. Cl.
*B60N 3/00*     (2006.01)
(52) U.S. Cl. ............... 296/24.34; 296/37.8; 296/70
(58) Field of Classification Search ............. 296/24.34, 296/37.8, 70; 351/829
See application file for complete search history.

(56) References Cited

U.S. PATENT DOCUMENTS

| | | | |
|---|---|---|---|
| 1,417,401 A * | 5/1922 | Mahoney ................... 312/297 |
| D218,438 S | 8/1970 | Shook et al. |
| 3,550,001 A | 12/1970 | Hanley |
| 3,984,161 A | 10/1976 | Johnson |
| 4,313,646 A * | 2/1982 | Millhimes et al. ........... 439/654 |
| D279,329 S | 6/1985 | Dzak |
| 4,733,900 A | 3/1988 | Fluharty |
| 4,846,382 A | 7/1989 | Foultner et al. |
| 5,005,898 A | 4/1991 | Benedetto et al. |
| 5,174,621 A | 12/1992 | Anderson |
| 5,181,555 A | 1/1993 | Chruniak |
| 5,199,772 A | 4/1993 | Jordan |
| 5,259,655 A * | 11/1993 | Anderson ..................... 296/70 |
| 5,282,556 A | 2/1994 | Bossert |
| 5,418,836 A * | 5/1995 | Yazaki .................... 455/569.2 |
| D363,916 S | 11/1995 | Johnson |
| 5,503,565 A * | 4/1996 | McCoy ........................ 439/171 |
| 5,680,974 A * | 10/1997 | Vander Sluis ............... 224/281 |
| 5,743,585 A * | 4/1998 | Pranger et al. ........... 296/37.12 |
| 6,048,020 A | 4/2000 | Gronowicz et al. |
| D425,475 S | 5/2000 | Herer |
| 6,062,623 A * | 5/2000 | Lemmen ..................... 296/37.8 |
| 6,086,129 A | 7/2000 | Gray |
| D429,209 S | 8/2000 | Inchaurregui |
| D429,684 S | 8/2000 | Johnson |
| 6,123,377 A | 9/2000 | Lecher et al. |
| D434,365 S | 11/2000 | Herer et al. |
| 6,176,534 B1 * | 1/2001 | Duncan ................... 296/37.12 |
| D437,299 S | 2/2001 | Johnson |
| D438,841 S | 3/2001 | Smith |
| D443,246 S | 6/2001 | Smith |
| D443,855 S | 6/2001 | Herer et al. |
| D447,998 S | 9/2001 | Pfeiffer et al. |
| D453,318 S | 2/2002 | Moore |
| 6,388,881 B2 * | 5/2002 | Yamauchi et al. ........... 361/704 |
| 6,428,072 B1 | 8/2002 | Moore |
| 6,709,041 B1 | 3/2004 | Hotary et al. |
| 7,165,687 B1 * | 1/2007 | Stevens et al. ........... 211/86.01 |
| 7,210,725 B2 | 5/2007 | Moore |
| 7,407,210 B2 * | 8/2008 | Arbaugh et al. .......... 296/24.34 |
| 2005/0035618 A1 * | 2/2005 | Toth et al. ................. 296/24.34 |
| 2009/0072565 A1 * | 3/2009 | Mayne, Jr. ................. 296/24.34 |

\* cited by examiner

*Primary Examiner*—Kiran B. Patel
(74) *Attorney, Agent, or Firm*—Charles J. Rupnick Attorney at Law

(57) ABSTRACT

A reconfigurable vehicle console having a plurality of interchangeable tongue-and-groove blank and equipment mounting panels and quick disconnect clamps associated with each panel.

20 Claims, 11 Drawing Sheets

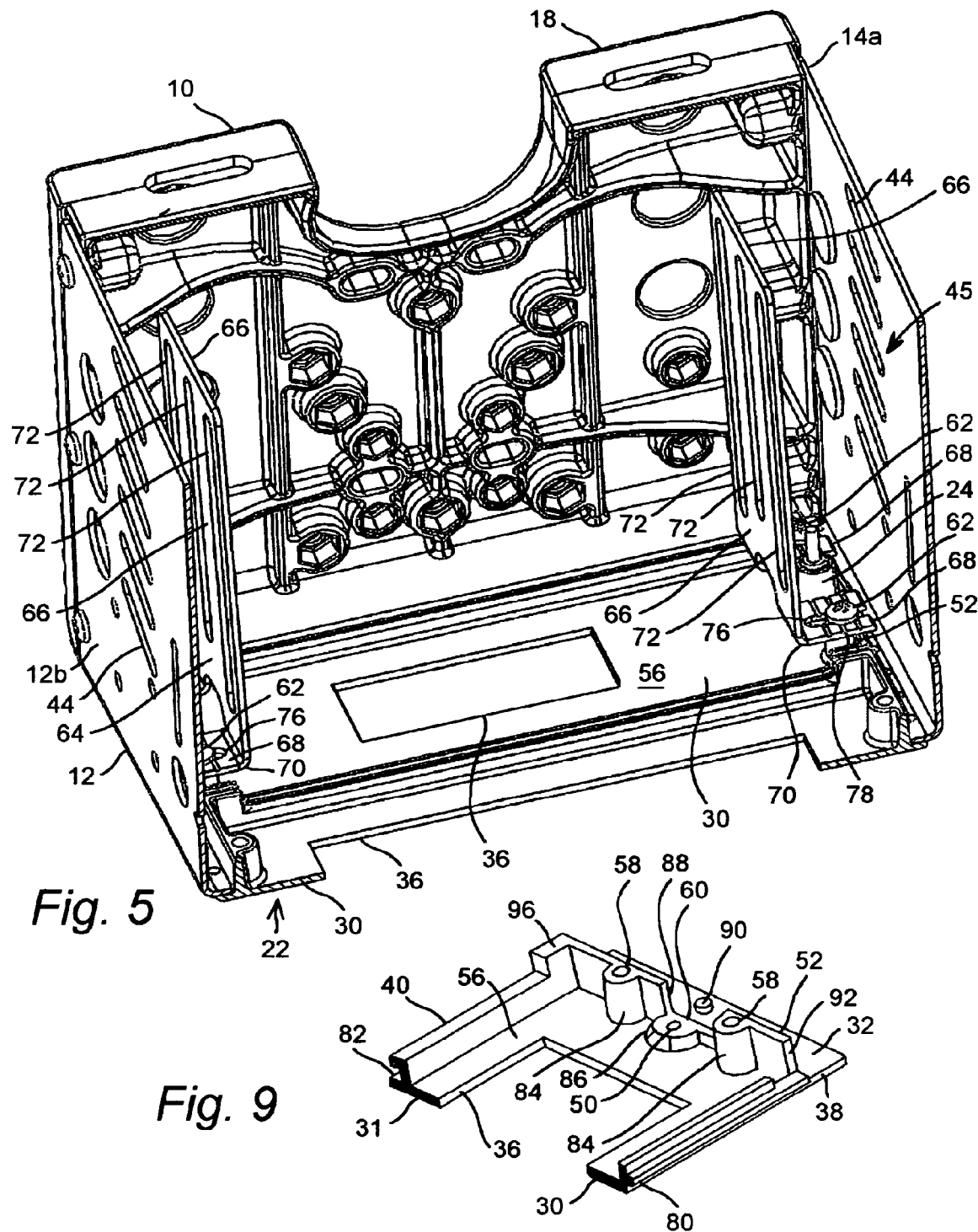

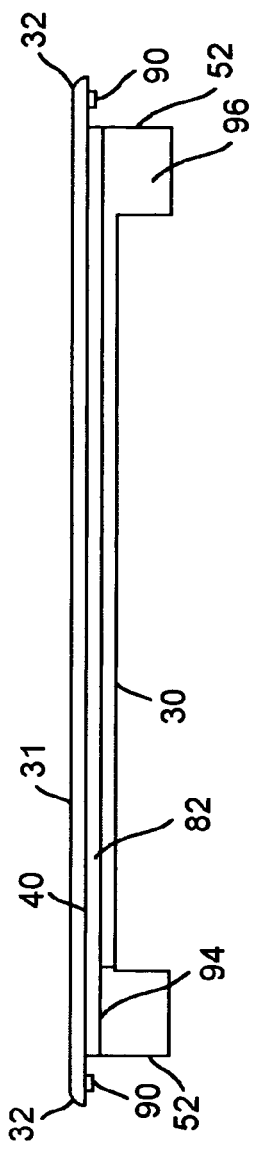
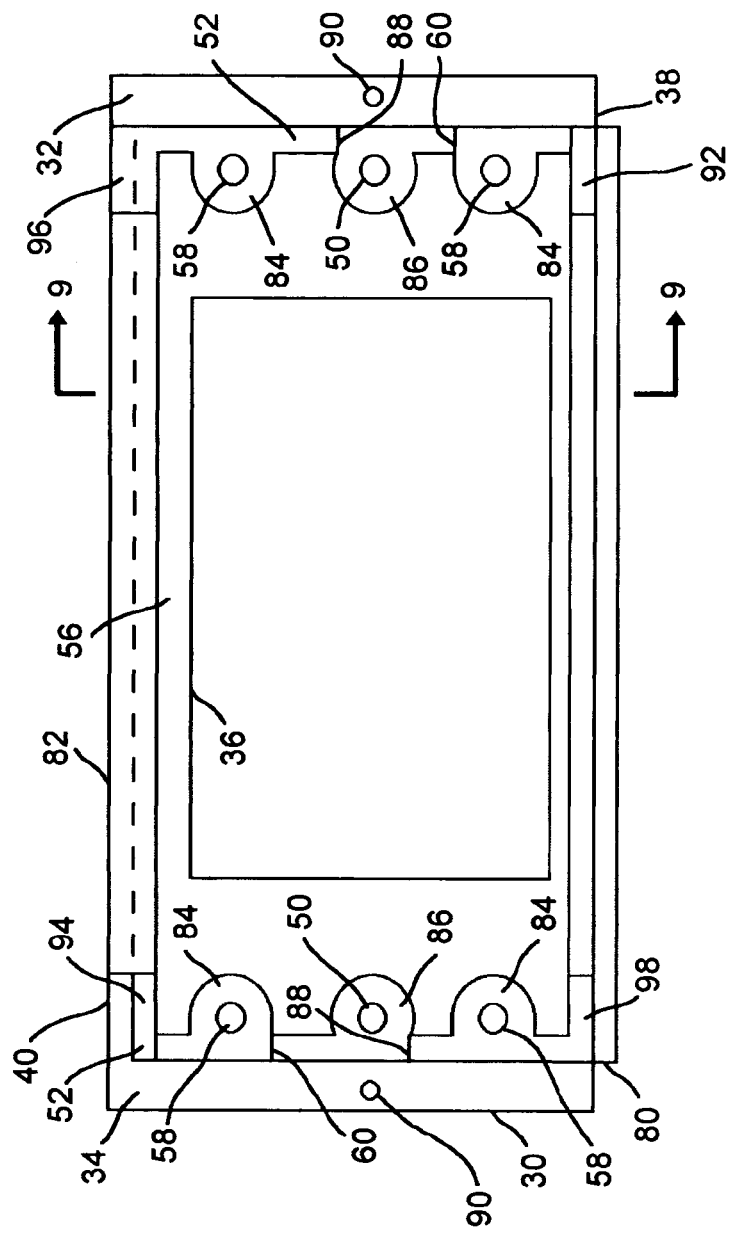
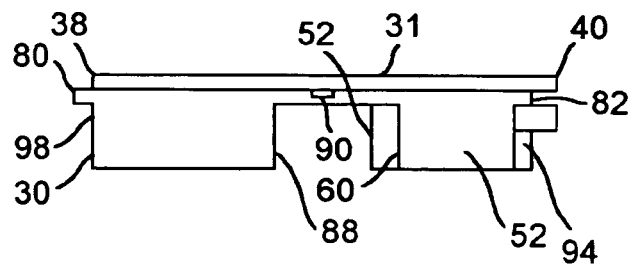

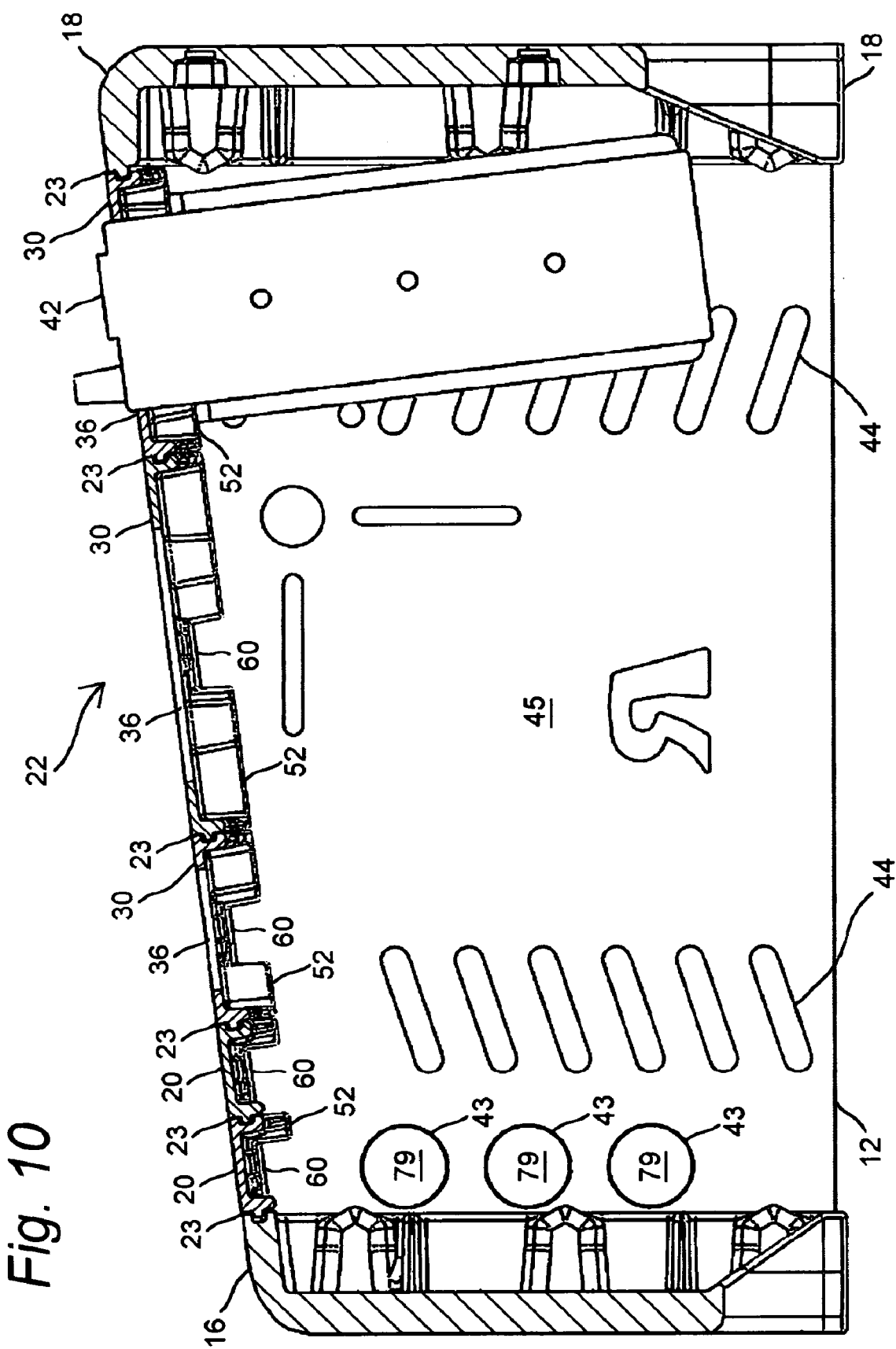

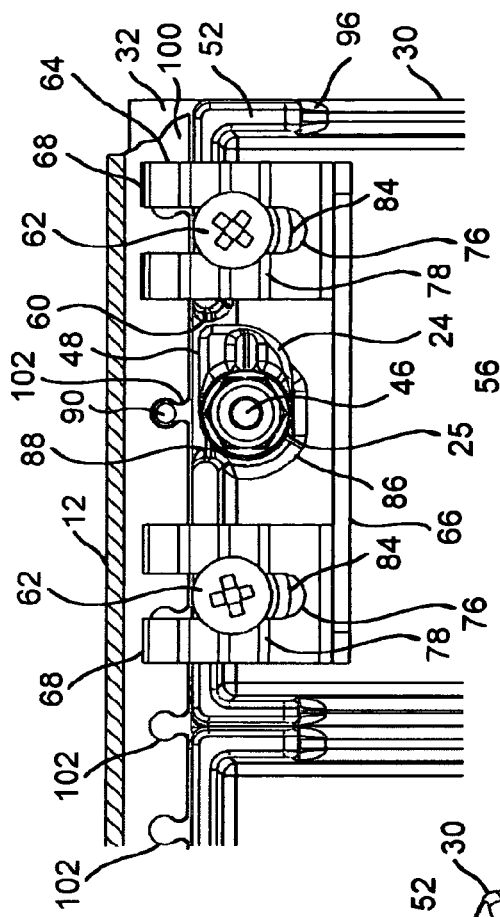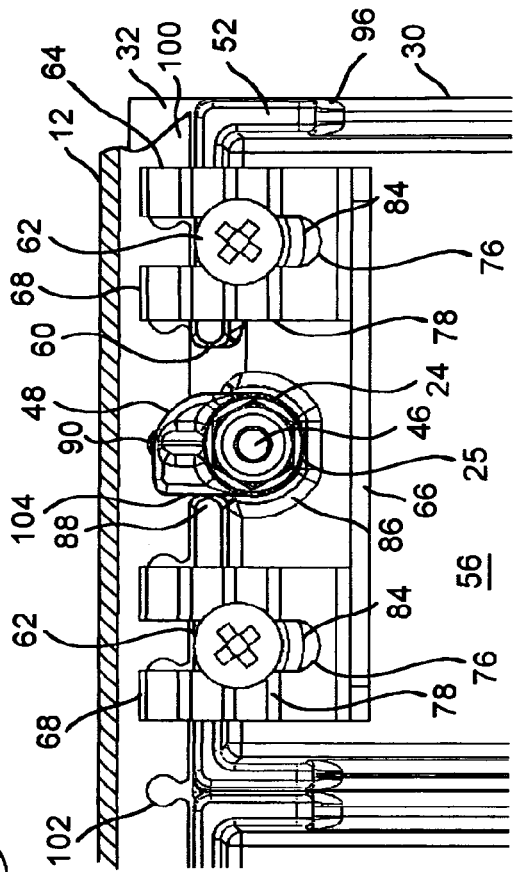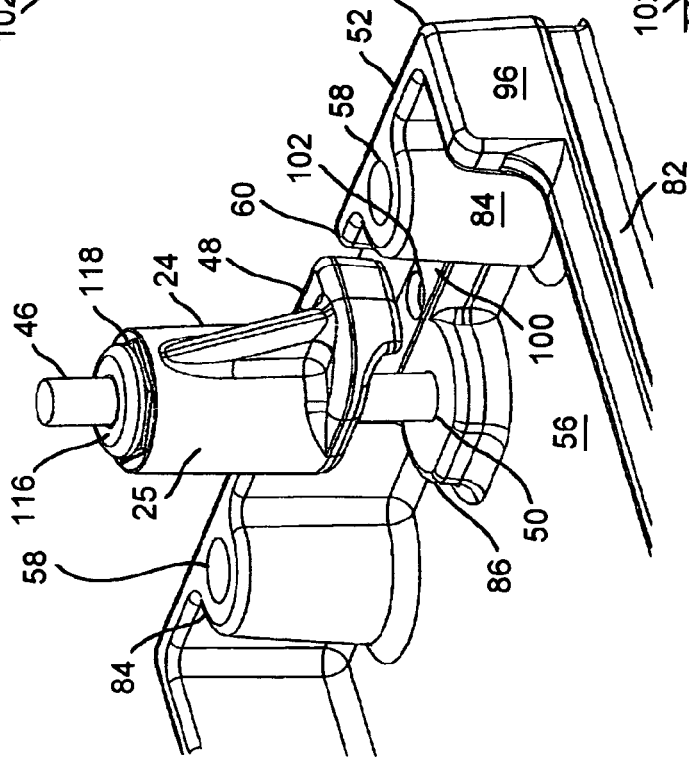

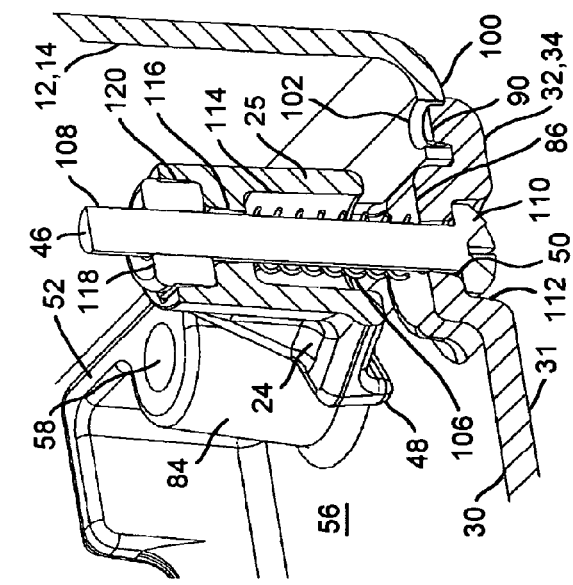
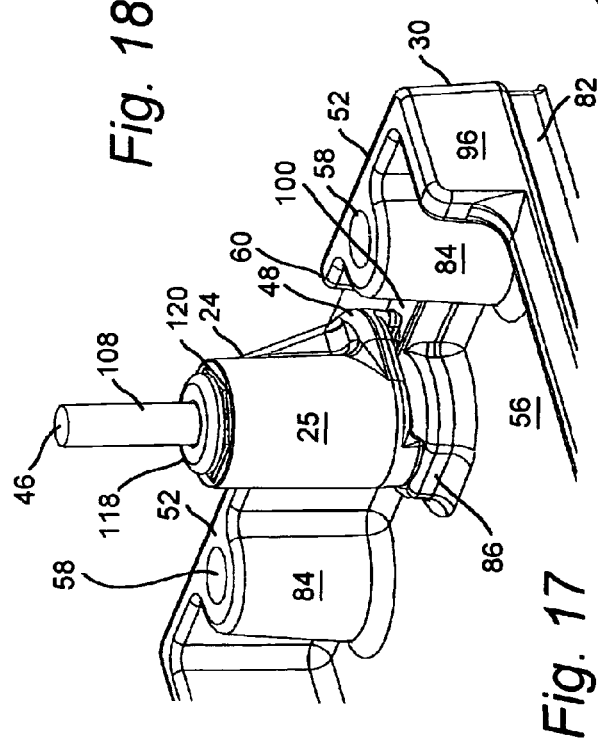
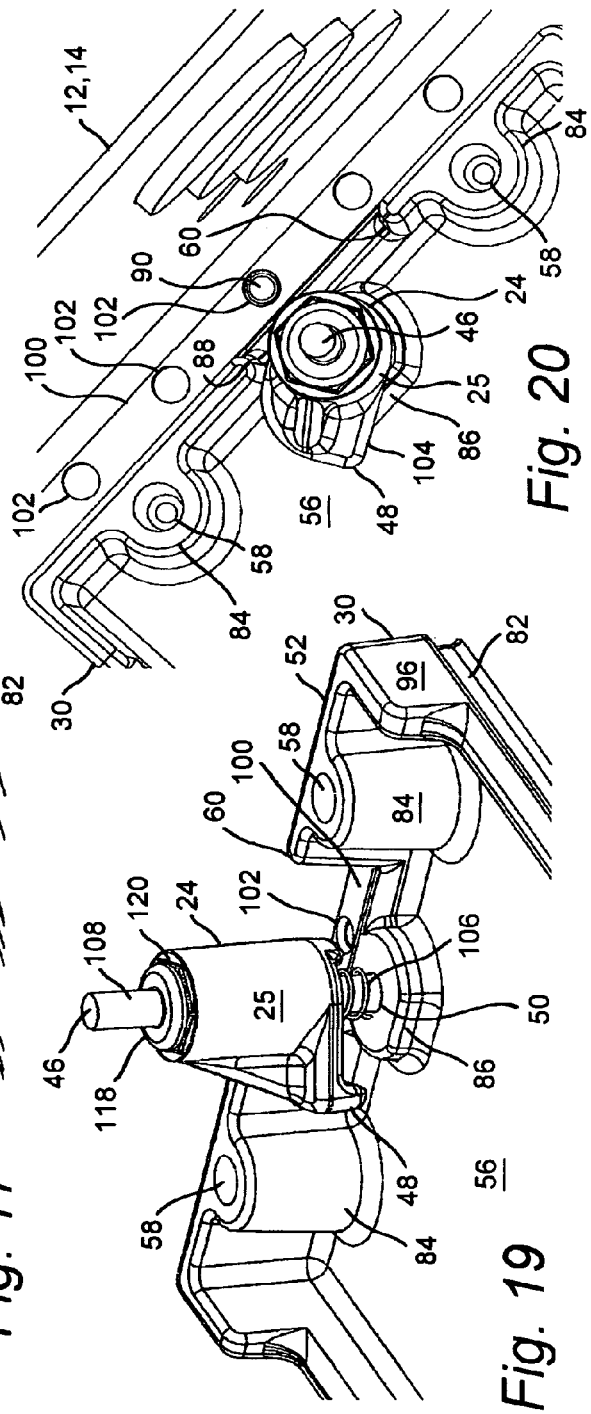

RECONFIGURABLE CONSOLE MOUNT HAVING A PLURALITY OF INTERCHANGEABLE TONGUE-AND-GROOVE BLANK AND EQUIPMENT MOUNTING PANELS AND QUICK DISCONNECT CLAMPS

FIELD OF THE INVENTION

The present invention relates to vehicle consoles and in particular to one that provides novel reconfigurable equipment mounting features, the console being mountable within a vehicle driver compartment to support equipment in a location easily accessible to a driver of the vehicle.

BACKGROUND OF THE INVENTION

Police officers, public safety officers, firefighters, paramedics and the like carry various types of equipment in their vehicles. Several pieces of equipment are often carried in a single vehicle, and the driver often needs to operate the equipment while simultaneously driving the vehicle. Thus, various devices exist to secure multiple pieces of equipment within a vehicle so that they are accessible to the driver and/or other persons in the vehicle driver compartment.

These devices commonly include a hollow rectangular box situated on the floor of the vehicle between the driver seat and front passenger seat, including a horizontal top portion having an upwardly facing opening for receiving pieces of equipment. Police cruisers, for example, are commonly fitted with equipment boxes of this type. The boxes are used to house various types of equipment and controls used by police officers, such as radios, siren controls and light bar controls. Typically, the boxes are sized and positioned so that most of the box extends between the driver seat and the front seat. Only a small portion, if any, of the box will extend forward toward the dashboard beyond the driver seat and front passenger seat. In some police cruisers, the equipment box extends all the way back to the prisoner partition separating the rear seating area from the driver compartment. A laptop computer is often positioned between the box and dashboard, and is secured to the vehicle floor with various types of mounting hardware.

Systems employing the conventional equipment box described above suffer from a number of problems associated with the structure of the box. The box includes removable multiple blank panels fastened on its top or upwardly facing surface. Removal of one or more of these blank panels opens a space where a radio or other piece of equipment can be mounted using brackets that fasten between the piece of equipment and opposing side panels of the box. Unfortunately, the equipment mounting brackets fasten to the box side panels using screws so the equipment is not easily repositioned within the bore or changed out for different pieces of equipment. Furthermore, the blank panels are simple rectangles of heavy sheet metal with squared edges so gaps are formed between the mounted equipment and adjacent blank panels, and between side by side blank panels when no equipment is mounted.

The conventional equipment box configuration described above makes it more difficult to remove a piece of equipment from this box, or reposition it along closer to one or another of the end panels. The configuration also permits cards and other slim objects such as driver's licenses to slip through the gaps between the mounted equipment and adjacent blank panels, and between side by side blank panels.

SUMMARY OF THE INVENTION

The present invention is a reconfigurable vehicle console having a plurality of interchangeable tongue-and-groove blank and equipment mounting panels and quick disconnect clamps associated with each panel.

According to one aspect of the reconfigurable vehicle console is formed of a pair of opposing first and second substantially rigid side panels with each side panel having an inwardly projected lip portion formed thereon substantially along an entire length thereof. A pair of opposing first and second substantially rigid end panels are substantially rigidly interconnected between first and second end portions of the side panels adjacent to opposite ends thereof.

A plurality of substantially rectangular removable panels are formed with opposing side lip portions that are sized to mate with a respective one of the inwardly projected lip portion of the first and second side panels. Each of the removable panels has a tongue positioned along a first edge thereof between the opposing side lip portions, a groove positioned along a second edge thereof between the opposing side lip portions opposite from the tongue and sized to mate therewith, first and second clamp actuator receivers formed therethrough and spaced inwardly of the respective side lip portions, and one or more of the panels is further formed with a cutout positioned between the side lip portions and the first and second edges and sized to receive an equipment piece therethrough, and one or more junctions structured for retaining the equipment piece relative thereto.

A pair of quick release clamps are associated with each of the removable panels. Each of the quick release clamp includes an actuator that is operable through a respective one of the clamp actuator receivers of one of the panels, and a jaw portion. The jaw portion of each clamp is responsive to actuation of the actuator for moving between a first unclamped state extended over the respective side lip portion and spaced away therefrom, and a second clamped state adjacent to the respective side lip portion with a portion of the lip portion of the respective first and second side panel clamped therebetween.

According to one aspect of the reconfigurable vehicle console, each of the clamps further includes a biasing member that is positioned to urge the jaw portion into the first unclamped state, and the actuator is further configured to force the jaw portion into the second clamped state.

According to another aspect of the reconfigurable vehicle console, each clamp is further responsive to actuation of the actuator for moving between a clamping position having the jaw portion extended over a respective one of the opposing side lip portions with the lip portion of a respective one of the opposing first and second substantially rigid side panels being positioned therebetween, and a release position having the jaw portion spaced inwardly of the respective opposing side lip portion, and wherein in the clamping position the jaw portion is further responsive to actuation of the actuator for moving between the first unclamped state and the second clamped.

According to another aspect of the reconfigurable vehicle console, the actuator of each of the clamps is further configured to rotate the jaw portion between the clamping position and the release position; and each of the panels is further formed with a substantially rigid stop portion positioned to engage the jaw portion of each of the clamps in at least one of the clamping position and the release position.

According to another aspect of the reconfigurable vehicle console, one of the opposing first and second substantially rigid end panels further includes a tongue that is positioned along an edge thereof between the opposing side lip portions and is sized to mate with the groove of one of the panels, and an other one of the end panels further includes a groove that is positioned along an edge thereof between the opposing side lip portions and is sized to mate with the tongue of one of the panels.

According to another aspect of the reconfigurable vehicle console, the inwardly projected lip portion of each side panel is further formed with a plurality of detent receivers that are substantially evenly spaced there along; and each of the plurality of removable panels is further formed with a detent on each of the side portions thereof, with the detent being positioned to mate with one of the plurality of detent receivers in the lip portion of a respective one of the first and second side panels.

According to another aspect of the reconfigurable vehicle console, the reconfigurable vehicle console also includes a plurality of substantially rigid L-brackets each being formed with a substantially rigid equipment interface portion and a substantially rigid panel interface portion that are substantially rigidly interconnected by a substantially rigid right angle portion which forms a substantially right angle therebetween. The equipment interface portion is further formed with a plurality of substantially parallel equipment interface slots oriented substantially perpendicularly of the right angle portion. The panel interface portion is further formed with a pair of panel interface slots oriented substantially perpendicularly of the right angle portion and positioned to substantially align with a pair of the junctions positioned on an inner surface of the panel. The panel interface portion is further formed with a plurality of substantially parallel grooves scoring a surface thereof at substantially regular intervals between the right angle portion and an outer end of the panel interface portion distal from the right angle portion. A connector is coupled between each of the panel interface slots and respective ones of the pair of junctions for retaining a piece of equipment relative to the cutout in one of the panels.

Other aspects of the invention are detailed herein.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 5 is a section view of the console normal showing the pair of L-brackets secured to an inner surfaces of an equipment mounting panel;

FIG. 6 is an exemplary side view of one equipment mounting panel;

FIG. 7 is an exemplary end view of one equipment mounting panel;

FIG. 8 is exemplary bottom view of one equipment mounting panel;

FIG. 9 is a section view taken through one equipment mounting panel;

FIG. 10 is a cross-section view of the console showing the tongue-and-groove joints between adjacent panels, and between the end panels and an adjacent one of removable panels;

FIG. 12 is an exemplary perspective view of one equipment mounting panel being installed or removed from the console;

FIG. 13 is an exemplary bottom view of one equipment mounting panel being installed or removed from the console;

FIG. 14 illustrates that a jaw portion of each clamp is sized to pass through a clearance notch in a substantially upright projection formed on the removable panels for moving between its release or installation position and a clamping position;

FIG. 17 is a section view that illustrates the releasable clamp in the second clamped state of the clamping position illustrated in FIG. 14;

FIG. 18 is a section view that illustrates the releasable clamp in the release position shown in FIGS. 12 and 13;

FIG. 19 is a perspective view of the releasable clamp being rotated into the release position, as illustrated in FIG. 18; and FIG. 20 is an exemplary bottom view of one equipment mounting panel being installed or removed from the console.

DETAILED DESCRIPTION OF PREFERRED EMBODIMENT

In the Figures, like numerals indicate like elements.

Figure 1:
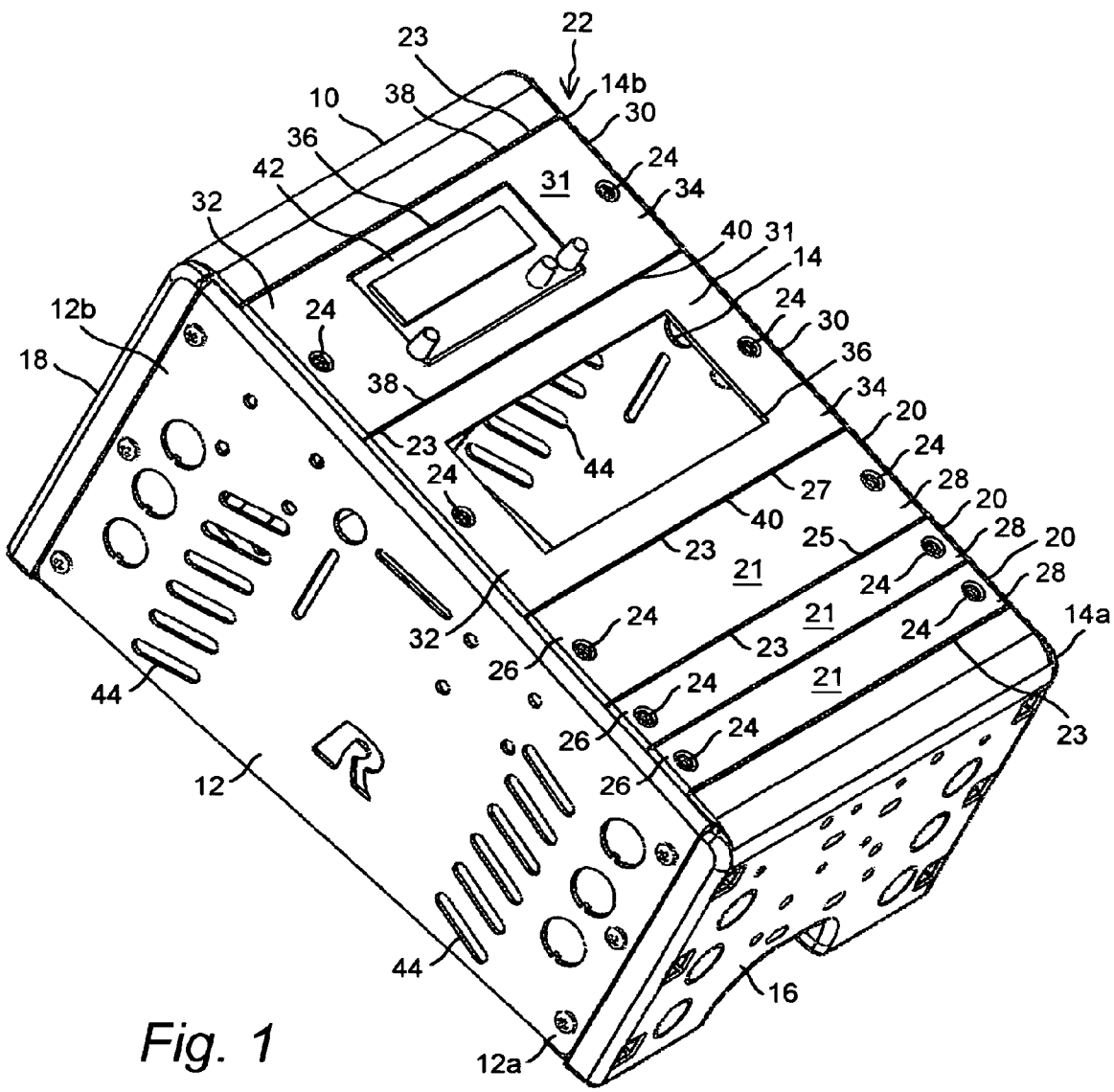
FIG. 1 is a perspective view showing an example of the novel reconfigurable vehicle console.

FIG. 1 is a perspective view that illustrates a novel reconfigurable vehicle console 10 having opposing first and second substantially rigid side panels 12 and 14 and opposing first and second substantially rigid end panels 16 and 18 that are substantially rigidly interconnected between first and second end portions 12a, 12b and 14a, 14b of the respective side panels 12, 14.

A plurality of substantially rectangular removable tongue-and-groove blank panels 20 are removably clamped between the side panels 12, 14 with respective substantially planar external or outer surfaces 21 partially forming a top or upwardly facing surface 22 of the console 10. Tongue-and-groove joints 23 are formed between adjacent blank panels 20 along opposing first and second edges 25 and 27 thereof, and additional tongue-and-groove joints 23 are formed between one of the blank panels 20 and an adjacent one of the end panels 16, 18. The blank panels 20 are all of a substantially uniform length between the side panels 12, 14, but are optionally any useful width between the end panels 16, 18. However, the blank panels 20 are optionally of a minimum unit width or an integral multiple of the minimum unit width.

A pair of releasable clamps 24 secures opposing side lip portions 26 and 28 of each of the blank panels 20 to the side panels 12, 14.

A plurality of substantially rectangular removable tongue-and-groove equipment mounting panels 30 are also clamped between the side panels 12, 14 with respective substantially planar external or outer surfaces 31 completing the formation of the top or upwardly facing surface 22 of the console 10. Tongue-and-groove joints 23 are formed between adjacent equipment mounting panels 30, and additional tongue-and-groove joints 23 are formed between one of the equipment mounting panels 30 and adjacent blank panels 20 and/or end panels 16, 18. The equipment mounting panels 30 are also of a substantially uniform length between the side panels 12, 14 substantially identical to the uniform length of the blank panels. The equipment mounting panels 30 are also optionally any useful width between the end panels 16, 18. However, the equipment mounting panels 30 are optionally an integral multiple of the minimum unit width of the blank panels 20. Additional pairs of the releasable clamps 24 secure opposing side lip portions 32 and 34 of each of the equipment mounting panels 30 to the side panels 12, 14. Additionally, the equipment mounting panels 30 are each formed with one or more cutouts 36 positioned between the side lip portions 32, 34 and opposing first and second edges 38 and 40 thereof. The cutouts 36 are sized to receive an equipment piece 42, such as a radio, global positioning sensor (GPS), or siren and light bar controls, therethrough with the equipment piece 42 being secured to the respective equipment mounting panel 30 as disclosed herein.

The side panels 12, 14 are configured for being secured to the drive shaft floor hump of the vehicle using, for example using an interface plate attached to the hump and having a plurality of fastener holes spaced along side flanges arranged along the hump. By example and without limitation, the side panels 12, 14 include a plurality of fastener passages 44 structured as holes or slots (shown) that can be used to secure the console 10 to the interface plate and even orient its upper surface 22 at an angle convenient for the vehicle operator.

Figure 2:
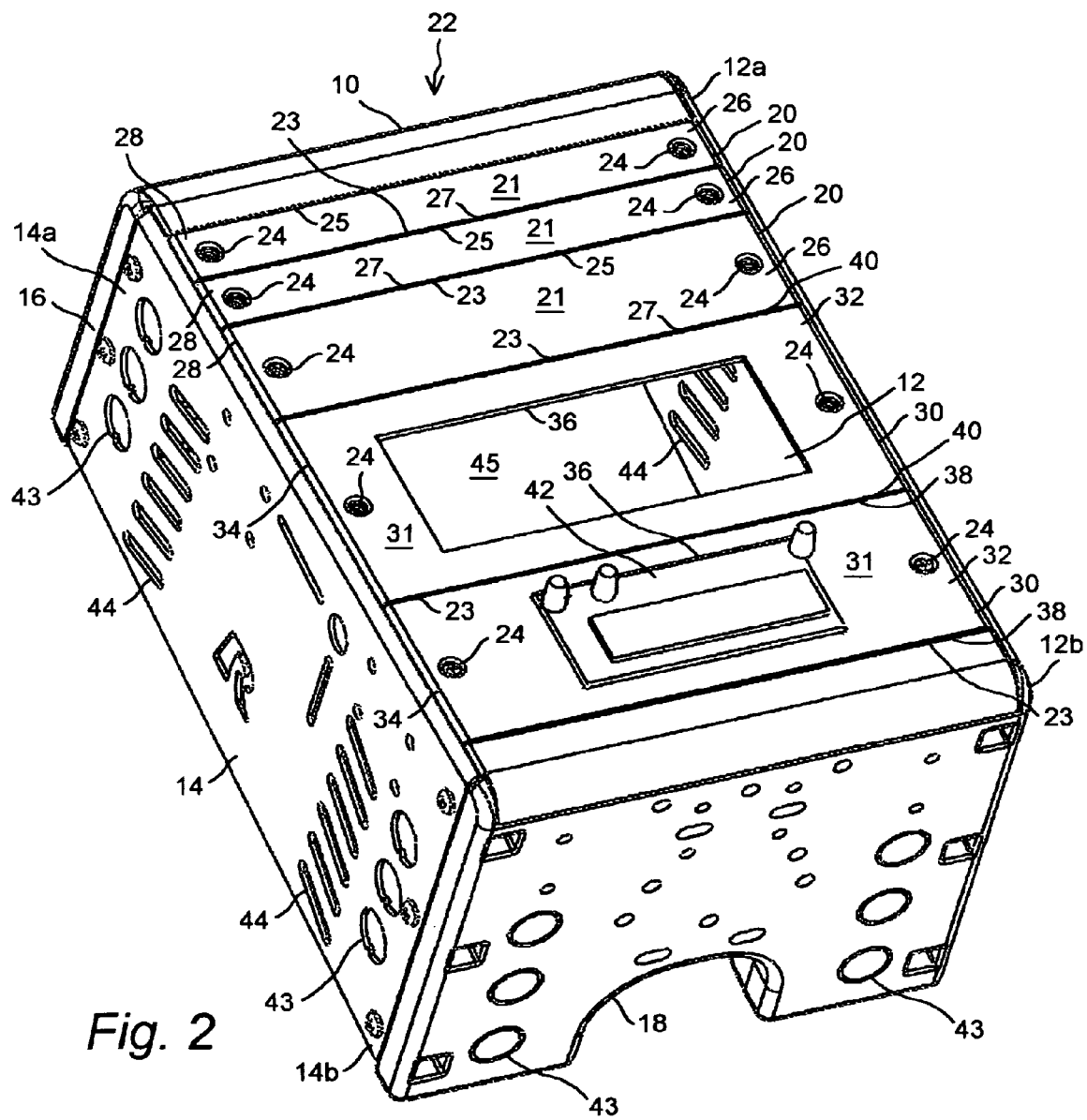
FIG. 2 illustrates the novel reconfigurable vehicle console of FIG. 1 viewed from an opposite end thereof.

FIG. 2 illustrates the novel reconfigurable vehicle console 10 of FIG. 1 viewed from the opposite end panel 18. FIG. 2 also illustrates the side panels 12, 14 each including a plurality of optional pass-through holes 43 into an interior portion 45 of the console 10. The optional pass-throughs 43, if present, may be utilized for running wiring into and out of the interior 45 of the console 10 for accommodating different equipment pieces 42.

Figure 3:
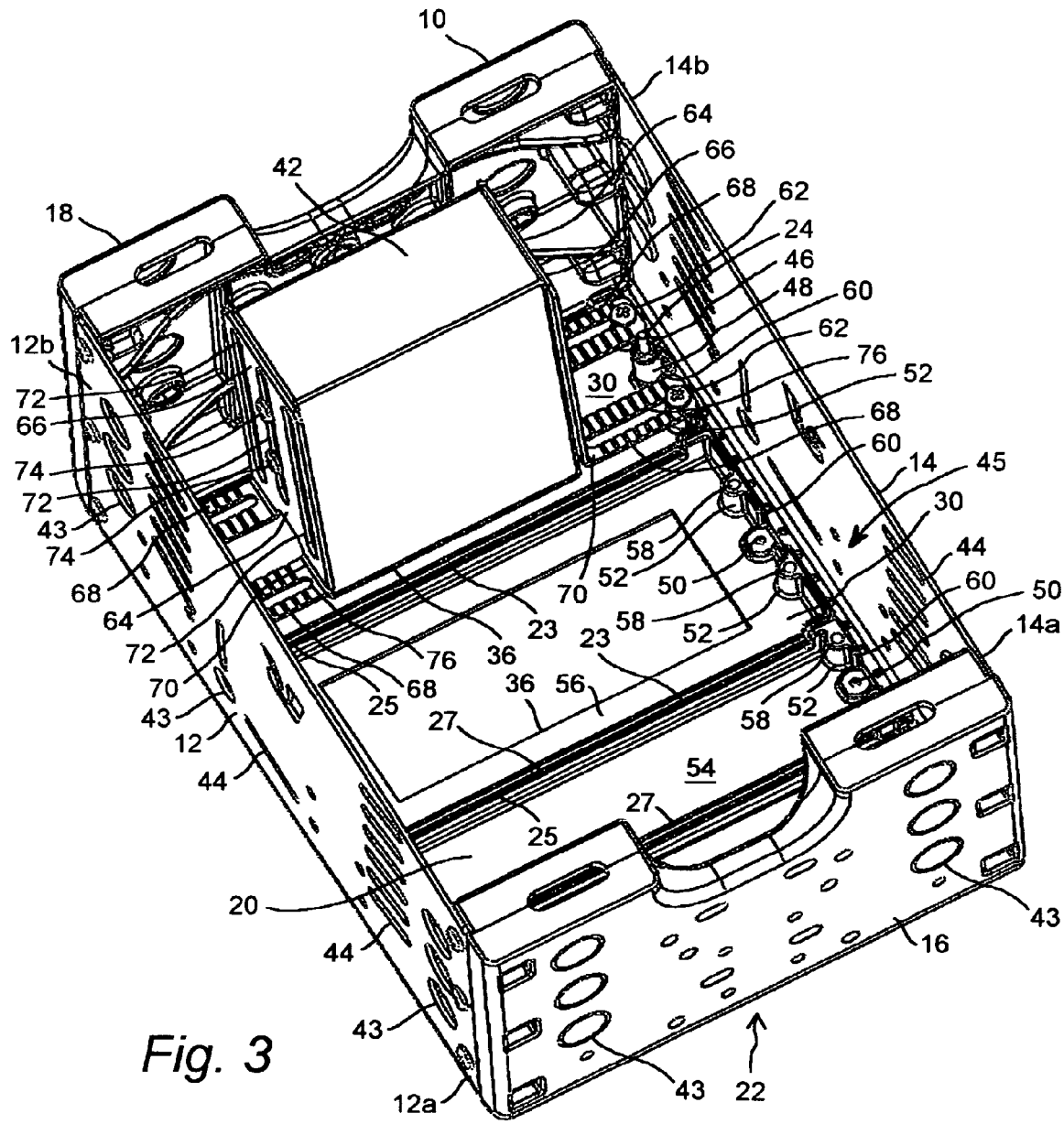
FIG. 3 is a view of the novel reconfigurable vehicle console viewed its underside.

FIG. 3 is a view of the novel reconfigurable vehicle console 10 viewed the underside opposite from the top or upwardly facing surface 22 and showing the interior portion 45 of the console 10. Here, each of the pair of releasable clamps 24 is shown having an actuator 46 and a movable jaw portion 48. The clamp actuator 46 is operable through one of a pair of clamp actuator receivers 50 formed as clearance passages through each of the respective blank panels 20 and equipment mounting panels 30 adjacent to their opposing side lip portions 26, 28 and 32, 34.

Each of the respective blank panels 20 and equipment mounting panels 30 are further illustrated to have a pair of substantially upright projections 52 positioned on respective substantially planar interior surface 54 and 56 thereof. The upright projections 52 are positioned adjacent to and slightly inwardly of respective opposing side lip portions 26, 28 and 32, 34 of each of the respective blank panels 20 and equipment mounting panels 30. The upright projections 52 extend substantially completely across the inner surface 54 of the blank panels 20 between their opposing first and second edges 25, 27. The upright projections 52 similarly extend substantially completely across the inner surface 56 of the equipment mounting panels 30 between their opposing first and second edges 38, 40.

Each projection 52 is further formed with a pair of fastener receivers 58 positioned on opposite sides of the respective clamp actuator clearance passage 50 and spaced away therefrom along the respective side lip portions 26, 28 and 32, 34 of each of the respective blank panels 20 and equipment mounting panels 30 outwardly toward the respective first and second edges 25, 27 and 38, 40. By example and without limitation, the fastener receivers 58 are configured for receiving a threaded fastener thereinto. The fastener receivers 58 are, for example, either blind, smooth bore holes structured for receiving self-tapping screws, or pre-threaded blind holes. A clearance notch 60 is positioned between the respective clamp actuator clearance passage 50 and the respective side lip portions 26, 28 and 32, 34 of each of the respective blank panels 20 and equipment mounting panels 30 and extending on either side of the respective clamp actuator clearance passage 50. The releasable clamps 24 operate through the clearance notch 60 as disclosed herein. A pair of the releasable clamps 24 secure the blank panels 20 and equipment mounting panels 30 to the side panels 12, 14 of the console 10.

A pair of fasteners 62 secure the equipment piece 42 to the equipment mounting panels 30 through a pair of substantially rigid L-brackets 64.

Figure 4:
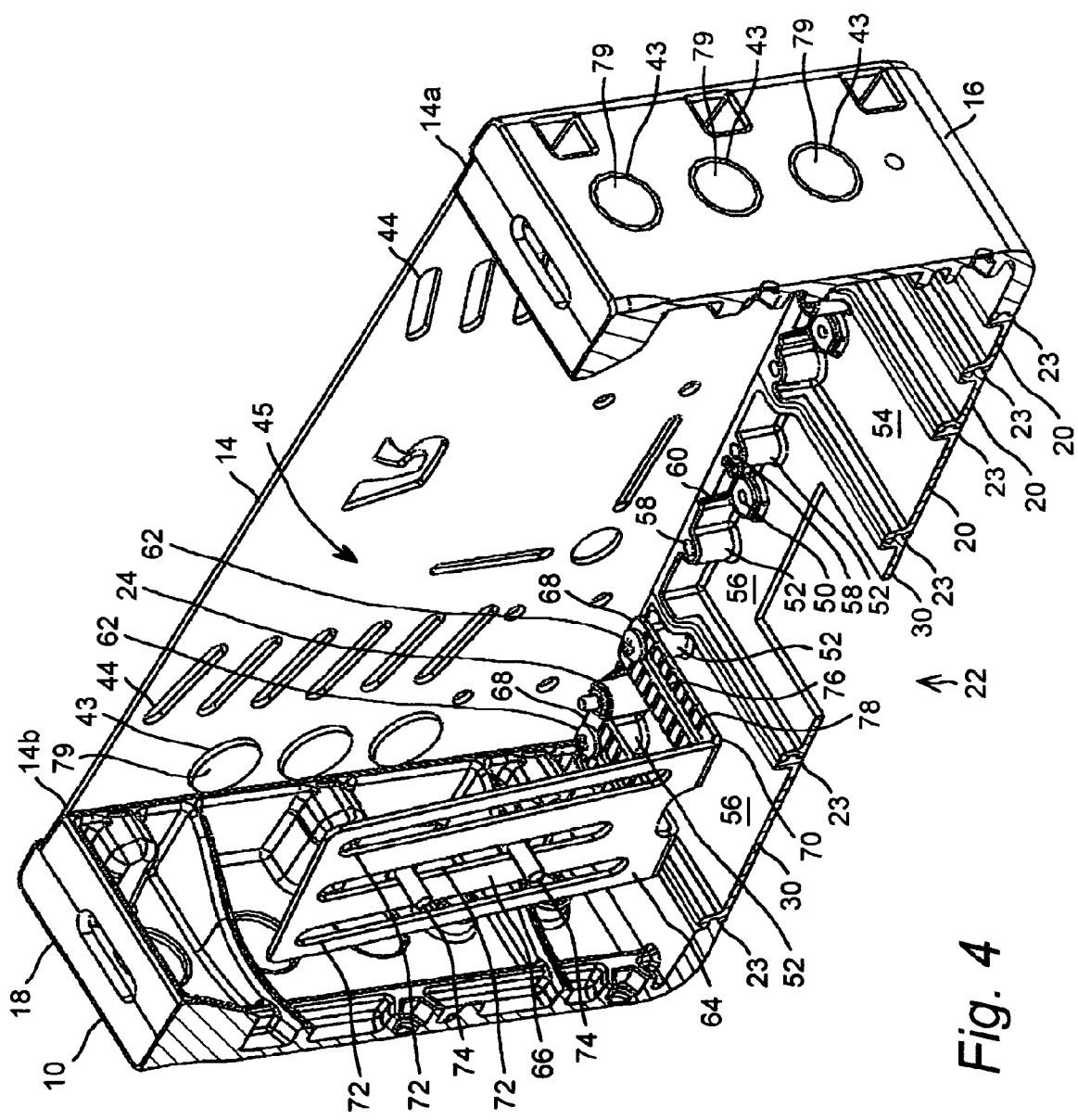
FIG. 4 illustrates one example of a pair of L-brackets that are utilized for securing a piece of equipment relative to a cutout in one of the panels.

FIG. 4 illustrates one example of the pair of substantially rigid L-brackets 64 wherein each is formed of a substantially rigid equipment interface portion 66 and a substantially rigid panel interface portion 68 that are substantially rigidly interconnected by a substantially rigid angle portion 70 forming a substantially right angle therebetween. The equipment interface portion 66 is formed with a plurality of substantially parallel equipment interface slots 72 oriented substantially perpendicularly of the right angle portion, and one or more fasteners 74 are utilized for securing the equipment interface portion 66 of each L-bracket 64 to opposite sides of the equipment piece 42.

The panel interface portion 68 is formed with a pair of panel interface slots 76 oriented substantially perpendicularly of the right angle portion 70 and positioned to substantially align with the pair of fastener receivers 58 of the upright projections 52 positioned on interior surfaces 56 of the respective equipment mounting panels 30. The securing fasteners 62 are received through respective panel interface slots 76 into the fastener receivers 58 for securing the L-brackets to the inner surfaces 56 of the respective equipment mounting panels 30.

Optionally, the panel interface portion 68 is split into a pair of spaced apart legs, as shown, each containing one of the pair of panel interface slots 76. A surface of each leg of the panel interface portion 68 is optionally further scored by a plurality of substantially parallel grooves 78 across the interface slots 76 at substantially regular intervals between the right angle portion 70 and an outer end of the panel interface portion 68 distal from right angle portion 70. The scoring grooves 78 are utilized for breaking the legs of the panel interface portion 68 to a convenient length to fit between the equipment piece 42 mounted on each equipment mounting panel 30 and the respective side panels 12, 14. The installer merely assembles the equipment piece 42 within one of the cutouts 36 in an equipment mounting panel 30 using the pair of L-brackets 64, then breaks off an excess portion of each leg of the panel interface portion 68 that extends beyond the projections 52 into the zones defined by the respective side lip portions 32, 34. The legs of the panel interface portion 68 are broken by metal fatigue that occurs by bending along one of the scoring grooves 78. After the legs of the panel interface portion 68 are broken the assembly of the equipment piece 42 and equipment mounting panel 30 fits easily into the space between the side panels 12, 14 of the console 10. The breakable legs of the panel interface portion 68 permit a single one-size-fits-all L-bracket 64 to be manufactured, stocked and supplied with the console 10, in contrast to custom L-brackets to fit each size of cutout 36, as was generally practiced in the prior art.

FIG. 4 also more clearly illustrates the tongue-and-groove joints 23 formed between adjacent blank panels 20 and an adjacent one of the end panels 16, 18, and further illustrates the tongue-and-groove joints 23 formed between adjacent equipment mounting panels 30 and an adjacent one of the end panels 16, 18, as well as tongue-and-groove joints 23 formed between adjacent blank panels 20 and equipment mounting panels 30.

FIG. 4 also illustrates the side panels 12, 14 having plurality of optional pass-through holes 43 into the interior portion 45 of the console 10. Here, the optional pass-throughs 43, if present, may also include knock-outs 79 that substantially seal the pass-throughs 43 until desired for utilization.

FIG. 5 is a section view of the console normal to the end panel 18 showing the pair of L-brackets 64 having their respective equipment interface portions 66 each secured to the projections 52 on the inner surfaces 56 of equipment mounting panel 30. The L-bracket 64 are shown having their respective equipment interface portions 66 projected away from the top or upwardly facing surface 22 of the console 10 into its interior 45 for supporting the equipment piece 42 (removed for clarity) relative the panel cutout 36.

FIG. 6, FIG. 7 and FIG. 8 are exemplary side, end and bottom views, respectively, of one equipment mounting panel 30. FIG. 9 is a section view taken through the equipment mounting panel 30 showing an illustrative partial bottom perspective view with the cutout 36 shown extending through equipment mounting panel 30 between the exterior and interior surfaces 31, 56 thereof.

The equipment mounting panel 30 is also shown having a tongue 80 positioned along one of its first and second edges 38, 40 extending most of the length of the panel 30 between the opposing side lip portions 32, 34, and a groove 82 positioned along the other one of its first and second edges 38, 40 opposite from the tongue 80 and sized to mate therewith. The groove 82 also extends most of the length of the panel 30 between the opposing side lip portions 32, 34 and is at least as long as the tongue 80. The tongue 80 and groove 82 of adjacent blank panels 20 and/or equipment mounting panels 30 are joined to form the tongue-and-groove joints 23 between adjacent panels 20 and/or 30. The tongue 80 and groove 82 of blank panels 20 and/or equipment mounting panels 30 are joined adjacent with end panels 16, 18 to form additional tongue-and-groove joints 23 therebetween.

The substantially upright projections 52 are further illustrated here as being positioned on the interior surface 56 of the equipment mounting panels 30 and opposite from the exterior interior surface 31 thereof. The upright projections 52 are positioned adjacent to and slightly inwardly of opposing side lip portions 32, 34 and extend substantially completely across the inner surface 56 of the equipment mounting panels 30 between opposing first and second edges 38, 40.

Each projection 52 is further formed with a pair of fastener receivers 58 positioned on opposite sides of the respective clamp actuator clearance passage 50 and spaced away therefrom along the respective side lip portions 32, 34 of equipment mounting panels 30 outwardly toward the opposing first and second edges 38, 40. By example and without limitation, the fastener receivers 58 are either threaded or unthreaded blind holes formed in columnar portions 84 of the projections 52. Accordingly, the projections 52 are optionally formed as a thin wall extended between opposing first and second edges 38, 40 of the equipment mounting panels 30 with the fastener receivers 58 formed in the thicker columnar portions 84 of the projections 52 positioned on opposite sides of the respective clamp actuator clearance passage 50.

By example and without limitation, the clamp actuator clearance passages 50 are formed in a thick boss 86 formed on the interior surface 56 of the equipment mounting panels 30, as illustrated. The bosses 86 and clearance passages 50 therein are each positioned at about the middle of the equipment mounting panels 30 equidistant between the edges 38, 40.

The clearance notch 60 is positioned between the clamp actuator clearance passage 50 and the side lip portions 32, 34 of the equipment mounting panels 30 and extends on either side of the respective clamp actuator clearance passage 50. However, the notch 60 is offset along each of the projections 52 relative to the clearance passage 50 so as to form a substantially upright jam 88 adjacent to the respective clamp actuator clearance passage 50 on one side of the clearance notch 60. The jam 88 is positioned to engage the jaw portion 48 of the releasable clamp 24 during its operation, as disclosed herein.

Each of opposing side lip portions 32, 34 of the equipment mounting panels 30 is further formed with a detent 90 positioned thereon for locating them on the first and second side panels 12, 14 of the console 10, as disclosed herein. By example and without limitation, the detents 90 are positioned in about the middle of the side lip portions 32, 34 equidistant between the edges 38, 40. The detents 90 are thus substantially aligned with the clamp actuator clearance passages 50 along a longitudinal direction of the equipment mounting panels 30.

The equipment mounting panel 30 is further illustrated by example and without limitation to have a first side notch 92 along its tongue edge 38 and a second side notch 94 along its groove edge 40 each adjacent to a respective one of side lip portions 32, 34. Edge portions 96 and 98 of the projections 52 adjacent to respective side lip portions 32, 34 are positioned to coincide with the respective first and second side notches 92, 94 of another of the equipment mounting panel 30 and sized to nest therein. The edge portions 96, 98 of the projections 52 have been found to stiffen the projections 52 and help stabilize the tongue-and-groove joints 23 between adjacent panels 30, but are not necessary for proper functioning of the console 10.

The blank panels 20 are substantially the same in construction as equipment mounting panels 30, except blank panels 20 do not require the projections 52 since blank panels 20 are not used to install equipment pieces 42 in the console 10.

FIG. 10 is a cross-section view of the console 10 showing the tongue-and-groove joints 23 between adjacent panels 20 and/or 30, as well as additional tongue-and-groove joints 23 between panels 20 and/or 30 and an adjacent one of the end panels 16, 18, as disclosed herein.

Figure 11:
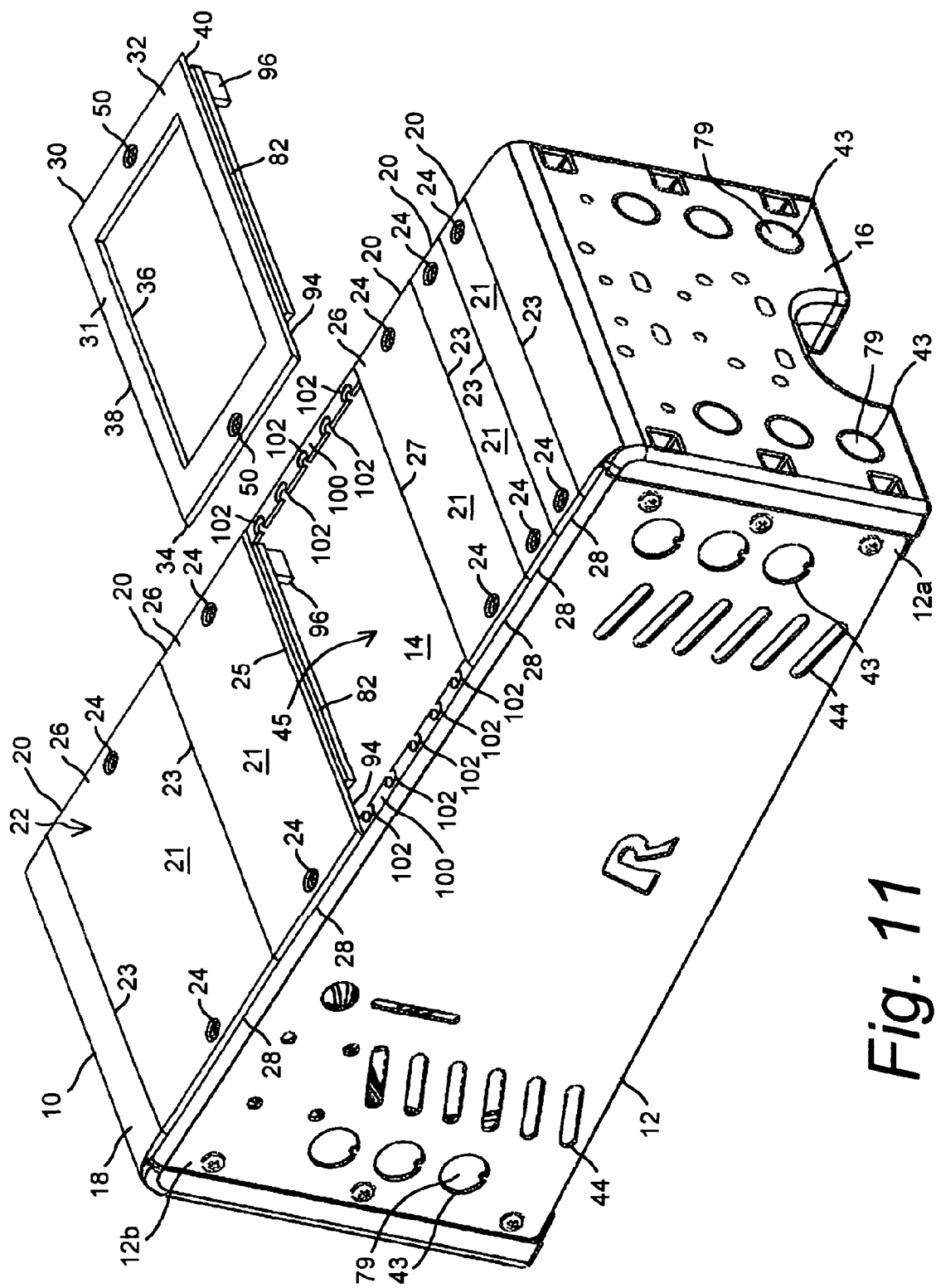
FIG. 11 illustrates installation/removal of one of the removable panels from the console.

FIG. 11 illustrates installation/removal of one of the equipment mounting panels 30 from the console 10. As illustrated here, the tongue 80 and groove 82 of each equipment mounting panels 30 is matable with the groove 82 and tongue 80 of each blank panel 20, and vice versa, to form the tongue-and-groove joints 23 therebetween. The tongue 80 and groove 82 of each blank and equipment mounting panel 20, 30 is also matable with the tongue and groove 80, 82 of the end panels 16, 18 so that either of the blank or equipment mounting panel 20, 30 is optionally positioned adjacent to either of the end panels 16, 18 for arranging the blank and equipment mounting panel 20, 30 as desired. Therefore, the console 10 is optionally fitted with any combination of blank and equipment mounting panels 20, 30 to suit an end purpose having one or more equipment piece 42 arranged on the console 10 in any order desired.

As illustrated here, side panels 12, 14 are each further formed with an upper mounting lip 100 bent at right angles and facing one another inwardly across the console 10. The mounting lips 100 support the opposing side lip portions 26, 28 and 32, 34 of each of the respective blank panels 20 and equipment mounting panels 30, while providing clearance for the two projections 52 on their respective interior surfaces 54, 56. Furthermore, the mounting lips 100 are formed with a plurality of upwardly facing detent receivers 102 spaced substantially evenly there along. Only by example and without limitation, the detent receivers 102 are illustrated here as openings or notches that open into the inwardly facing edge of the mounting lip 100. The openings or notches 102 are sized to receive the detents 90 of any of the blank and equipment mounting panels 20, 30. Furthermore, the openings or notches 102 are positioned at substantially uniform intervals substantially equal to the minimum unit width of the blank panels 20 so as to receive any of the blank and equipment mounting panels 20, 30 with no gaps between adjacent panels 20, 30.

FIG. 12 and FIG. 13 are exemplary perspective and bottom views, respectively, of one equipment mounting panel 30 being installed or removed from the console 10. The releasable clamps 24 is shown in a release position having its jaw portion 48 spaced inwardly of the respective opposing side lip portion 32, 34 for passing between the opposing inwardly facing upper mounting lip 100 of the console side panels 12, 14 for removal of the equipment mounting panel 30 from the console 10. The releasable clamps 24 are similarly positioned for passing between the opposing inwardly facing upper mounting lip 100 of the console side panels 12, 14 during installation of the equipment mounting panel 30 into the console 10. Thus, the position shown for the releasable clamps 24 operates as both a release position and an installation position.

In FIG. 13, the right angled upper mounting lip 100 of the side panels 12, 14 is broken away to reveal the side lip portions 32, 34 of the equipment mounting panels 30 resting on its upper surface.

FIG. 14 illustrates that the jaw portion 48 of each clamp 24 is sized to pass through the clearance notch 60 in a respective one of the first and second substantially upright projections 52 for moving between its release or installation position and a clamping position. Here, the clamp 24 is transitioned from the release position shown in FIGS. 12 and 13 wherein the jaw 48 is spaced inwardly of the respective opposing side lip portion 32, 34, to a clamping position having the jaw portion 48 oriented substantially transverse of and extended over a respective one of the opposing side lip portions 32, 34 with the upper mounting lip portion 100 of a respective one of the opposing first and second side panels 12, 14 being positioned therebetween.

For example, each releasable clamp 24 includes a substantially rigid body portion 25 which is formed with the jaw portion 48. The body portion 25 is movable by the actuator portion 46 of the clamp 24 for rotating the jaw portion 48 for transitioning between the release and clamping positions.

In the clamping position of the releasable clamp 24, the jaw 48 portion of the movable clamp body 25 is positioned in the respective clamp actuator clearance passage 50 through the projections 52. A stop portion 104 of the jaw 48 is substantially engaged with the substantially upright jam 88 forming one side of the respective clamp actuator clearance passage 50. The jaw portion 48 of the clamp body 25 is thus oriented substantially transverse of the respective side lip portion 32, 34 and extended generally over the detent 90.

Figure 15:
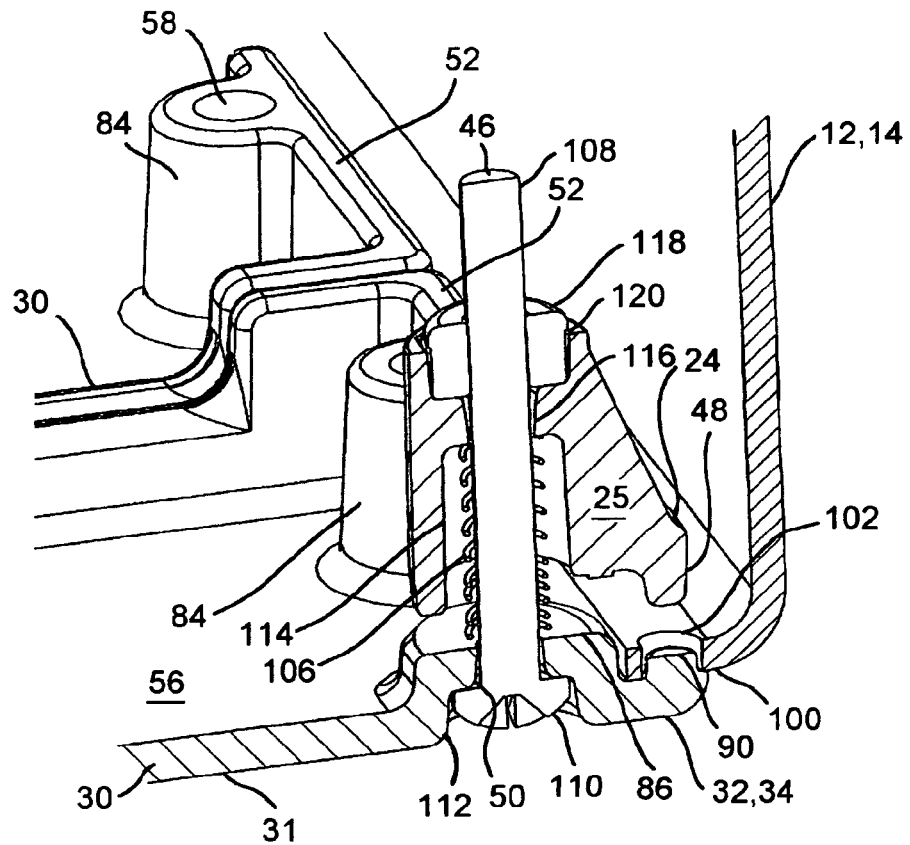
FIG. 15 is a section view that illustrates the releasable clamp in a first unclamped state of the clamping position illustrated in FIG. 14 having the jaw portion of the clamp body engaged with a substantially rigid jam at one side of the respective clamp actuator clearance passage.

FIG. 15 is a section view that illustrates the releasable clamp 24 in the clamping position illustrated in FIG. 14 having the jaw portion 48 of the clamp body 25 engaged with the substantially upright jam 88 at one side of the respective clamp actuator clearance passage 50. Here, the releasable clamp 24 is illustrated in a first unclamped state having the jaw portion 48 of the movable clamp body 25 oriented substantially transverse of the respective side lip portion 32, 34 and spaced away therefrom in a position extended thereover. The respective side lip portion 32, 34 of the equipment mounting panel 30 resting on the right angle, inwardly facing upper mounting lips 100 of the side panels 12, 14 of the console 10. The detents 90 of the respective side lip portions 32, 34 are nested in the respective openings or notches 102 of the upper mounting lips 100 of the side panels 12, 14.

The releasable clamp 24 is shown here in cross-section. The clamp actuator 46 is operable through a respective one of the clamp actuator clearance passages 50 formed through each equipment mounting panel 30 adjacent to the opposing side lip portions 32, 34. Each of the releasable clamps 24 has a compression spring or other biasing member 106 positioned to urge the movable clamp body 25 and jaw portion 48 away from the respective side lip portion 32, 34. The actuator portion 46 is further configured to force the movable clamp body 25 into the first unclamped state having the jaw portion 48 spaced above the respective side lip portion 32, 34 in a position extended thereover.

The actuator portion 46 of releasable clamps 24 has an elongated threaded shaft portion 108 sized to pass through a respective one of the first and second clamp actuator clearance passages 50 in the equipment mounting panel 30, and a slotted head portion 110 positioned externally of the outer surface 31 of the equipment mounting panel 30, by example and without limitation within an appropriate recess 112 such as a countersink or counterbore (shown).

The movable clamp body 25 of each releasable clamp 24 is formed with an elongated internal bore 114 having the actuator shaft 108 passing therethrough. The biasing member 106 is compressible within the elongated internal bore 114. The elongated threaded shaft portion 108 of the actuator portion is extended through a clearance passage 116 formed through the movable clamp body 25 and substantially aligned with the internal bore 114.

A threaded portion 118 of the clamp body 25 is substantially aligned with the bore 114 at its base opposite from the jaw portion 48 and threadedly mated with the threaded shaft portion 108 of the actuator 46. For example, the threaded portion 118 of the clamp body 25 is internally threaded. Alternatively, the threaded portion 118 of the clamp body 25 is a separate internally threaded nut. When the threaded portion 118 of the clamp body 25 is a separate nut, as shown, the nut 118 is optionally seated in a socket 120 formed opposite from the internal bore 114. The socket 120 substantially restrains the separate nut 118 from turning relative to the clamp body 25 when the actuator 46 is operated.

Figure 16:
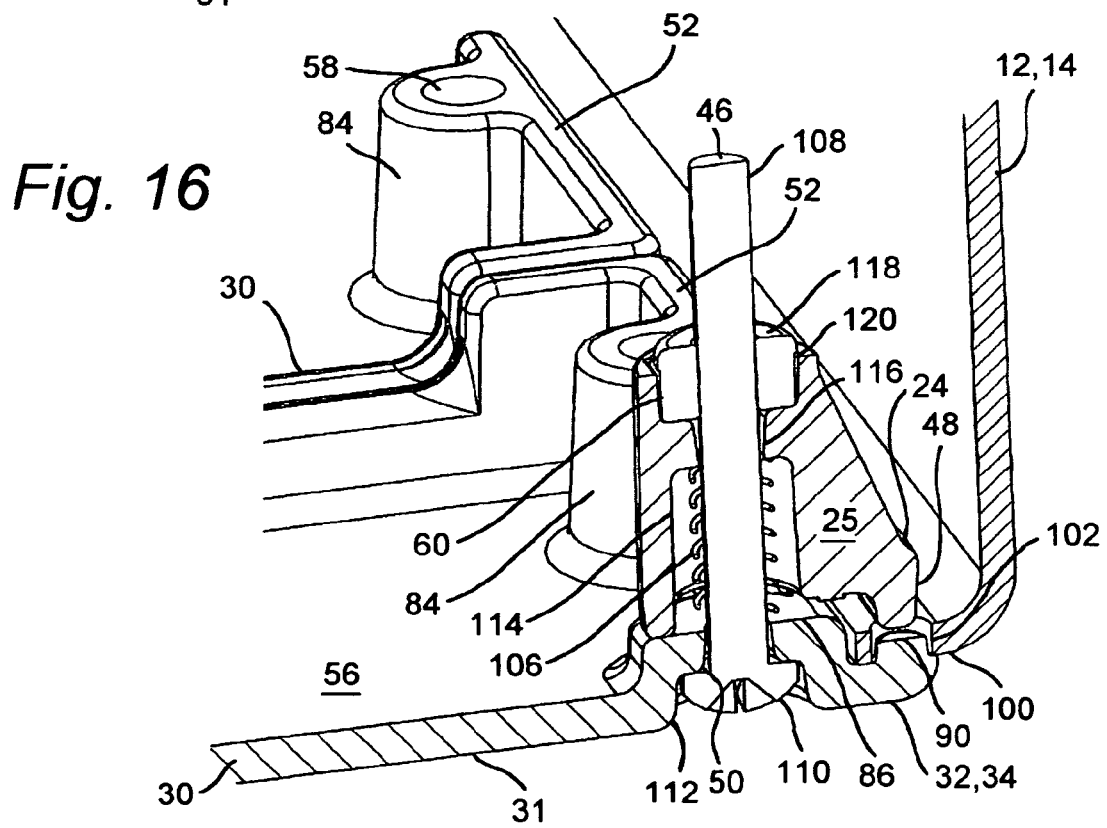
FIG. 16 is a section view that illustrates the releasable clamp in the first unclamped state of the clamping position illustrated in FIG. 14.

FIG. 16 is a section view that illustrates the releasable clamp 24 in the clamping position illustrated in FIG. 14. Here, the releasable clamp 24 is shown having the movable clamp body 25 transitioned from the first unclamped state shown in FIG. 15 wherein the jaw portion 48 is spaced above the respective side lip portion 32, 34 in a position extended thereover, to a second clamped state wherein the jaw portion 48 is oriented substantially transverse of the respective side lip portion 32, 34 and compressed adjacent thereto with a portion of the upper mounting lips 100 of the respective side panels 12, 14 clamped between clamp jaw portion 48 and the respective side lip portion 32, 34. During such transition, the actuator 46 of the clamp 24 is actuated, for example by rotating in the clamp actuator clearance passage 50 relative to the threaded portion 118 of the clamp body 25. Such actuation of the actuator 46 forces the clamp body 25 toward the interior surface 56 of the equipment mounting panels 30, while drawing the clamp jaw portion 48 toward the respective side lip portion 32, 34. Accordingly, the compression spring or other biasing member 106 of the releasable clamps 24 is compressed within the internal bore 114 of the clamp body 25. The biasing member 106 is thus compressed and ready to force the releasable clamp 24 back into the first unclamped state, shown in FIG. 15, by forcing the movable clamp body 25 away from the interior surface 56 of the equipment mounting panel 30 for moving the jaw portion 48 away from the respective side lip portion 32, 34 and releasing its hold on the upper mounting lips 100 of the side panels 12, 14 of the console 10.

FIG. 17 is a section view of the second clamped state of the releasable clamp 24, as illustrated in FIG. 16, wherein the jaw portion 48 is oriented substantially transverse of the respective side lip portion 32, 34 and compressed adjacent thereto with a portion of the upper mounting lip 100 of the respective side panel 12, 14 clamped between clamp jaw portion 48 and the respective side lip portion 32, 34.

FIG. 18 is a section view that illustrates the releasable clamp 24 in the release position shown in FIGS. 12 and 13 wherein the clamp body 25 is spaced away from the interior surface 56 of the equipment mounting panels 30 by expansion of the biasing member 106, and the clamp jaw portion 48 is rotated by operation of the actuator 46 inwardly through the clearance notch 60 into a position spaced inwardly of the respective opposing side lip portion 32, 34. For example, as operation of the actuator 46 relieves the compressive force on the clamp body 25, the biasing member 106 urges the jaw portion 48 away from compressive contact with the upper mounting lip 100 of the respective console side panels 12, 14. After compressive contact with the upper mounting lip 100 is relieved, clamp body 25 is permitted to rotate in the direction of rotation of actuator portion 46, carrying with it the jaw portion 48 thereof. The clamp body 25 rotates at least until the jaw portion 48 is rotated into the release position.

FIG. 19 is a perspective view of the releasable clamp 24 being rotated into the release position, as illustrated in FIG. 18, wherein the jaw 48 is spaced inwardly of the respective opposing side lip portion 32, 34.

FIG. 20 is an exemplary bottom view of one equipment mounting panel 30 being installed or removed from the console 10. The releasable clamp 24 is illustrated being rotated into the release position, as illustrated in FIGS. 18 and 19, wherein the jaw 48 is spaced inwardly of the respective opposing side lip portion 32, 34. Here, the clamp body 25 is illustrated being rotated until the jaw portion 48 engages the jam portion 88 of the clearance notch 60. Thereafter, the clamp body 25 cannot be rotated further due to interference of the jam 88. Accordingly, the jaw portion 48 is restricted from reentering the clearance notch 60 and so is positioned to clear the upper mounting lip 100 of the console side panels 12, 14 for removal of the equipment mounting panel 30 from the console 10, or installation thereinto.

It will be understood that one or more blank panels 20 are installed in substantially identical manner for filling gaps, if present, not filled by additional equipment mounting panels 30. It will be further understood that the releasable clamps 24 are utilized in substantially identical manner as described herein for securing the blank panels 20, when present, relative to the upper mounting lips 100 of the console side panels 12, 14.

While the preferred and additional alternative embodiments of the invention have been illustrated and described, it will be appreciated that various changes can be made therein without departing from the spirit and scope of the invention. Therefore, it will be appreciated that various changes can be made therein without departing from the spirit and scope of the invention. Accordingly, the inventor makes the following claims.

What is claimed is:

1. A reconfigurable vehicle console, comprising:
opposing first and second substantially rigid side panels, each side panel further comprising an upper mounting lip;
opposing first and second substantially rigid end panels substantially rigidly interconnected between first and second end portions of the side panels;
a plurality of substantially rectangular removable panels comprising opposing side lip portions sized to mate with a respective one of the upper mounting lip of the first and second side panels, and further comprising:
a tongue positioned along a first edge thereof between the opposing side lip portions,
a groove positioned along a second edge thereof between the opposing side lip portions opposite from the tongue and sized to mate therewith,
first and second clamp actuator receivers formed therethrough and spaced inwardly of the respective side lip portions, and
one or more of the panels further comprising a cutout positioned between the side lip portions and the first and second edges and sized to receive an equipment piece therethrough, and one or more fastener receivers structured for retaining the equipment piece relative thereto;
a plurality of pairs of quick release clamps, each quick release clamp comprising an actuator operable through a respective one of the clamp actuator receivers of one of the panels, and a jaw portion, the jaw portion of each clamp being responsive to actuation of the actuator for moving between a first unclamped state extended over the respective side lip portion and spaced away therefrom, and a second clamped state adjacent to the respective side lip portion with a portion of the upper mounting lip of the respective first and second side panel clamped therebetween.

2. The console of claim 1 wherein each of the clamps further comprises a biasing member positioned to urge the jaw portion into the first unclamped state, and the actuator is further configured to force the jaw portion into the second clamped state.

3. The console of claim 2 wherein each clamp is further responsive to actuation of the actuator for moving between a clamping position having the jaw portion extended over a respective one of the opposing side lip portions with the upper mounting lip of a respective one of the opposing first and second substantially rigid side panels being positioned therebetween, and a release position having the jaw portion spaced inwardly of the respective opposing side lip portion, and wherein in the clamping position the jaw portion is further responsive to actuation of the actuator for moving between the first unclamped state and the second clamped.

4. The console of claim 3 wherein the actuator of each of the clamps is further configured to rotate the jaw portion between the clamping position and the release position; and
wherein each of the panels further comprises a substantially rigid stop portion positioned to engage the jaw portion of each of the clamps in at least one of the clamping position and the release position.

5. The console of claim 3 wherein one of the opposing first and second substantially rigid end panels further comprises a tongue positioned along an edge thereof between the opposing side lip portions and sized to mate with the groove of one of the removable panels, and an other one of the end panels further comprises a groove positioned along an edge thereof between the opposing side lip portions and sized to mate with the tongue of one of the removable panels.

6. The console of claim 5 wherein the upper mounting lip of each side panel further comprises a plurality of detent receivers substantially evenly spaced there along; and
   wherein each of the plurality of removable panels further comprises a detent on each of the side portions thereof being positioned to mate with one of the plurality of detent receivers in the upper mounting lip of a respective one of the first and second side panels.

7. The console of claim 5, further comprising a plurality of substantially rigid L-brackets each comprising a substantially rigid equipment interface portion and a substantially rigid panel interface portion substantially rigidly interconnected by a substantially rigid right angle portion forming a substantially right angle therebetween, wherein the equipment interface portion further comprises a plurality of substantially parallel equipment interface slots oriented substantially perpendicularly of the right angle portion, and wherein the panel interface portion further comprises a pair of panel interface slots oriented substantially perpendicularly of the right angle portion and positioned to substantially align with a pair of the fastener receivers positioned on an inner surface of the panel and further comprising a plurality of substantially parallel grooves scoring a surface of the panel interface portion at substantially regular intervals between the right angle portion and an outer end of the panel interface portion distal from the right angle portion; and
   further comprising a connector coupled between each of the panel interface slots and respective ones of the pair of fastener receivers.

8. A reconfigurable vehicle console, comprising:
   opposing first and second substantially rigid side panels, each side panel further comprising an upper mounting lip formed with a plurality of discrete openings substantially evenly spaced along a length thereof;
   opposing first and second substantially rigid end panels substantially rigidly interconnected between first and second end portions of the side panels;
   a plurality of substantially rectangular removable blank panels each comprising opposing side lip portions each having a detent positioned thereon to mate with a respective one of the plurality of discrete openings spaced along the upper mounting lip of the first and second side panels, and further comprising:
      a tongue positioned along a first edge thereof between the opposing side lip portions,
      a groove positioned along a second edge thereof between the opposing side lip portions opposite from the tongue and sized to mate therewith, and
      first and second clamp actuator clearance passages formed between inner and outer surfaces and positioned spaced inwardly of the respective detents and substantially aligned therewith;
   a plurality of substantially rectangular removable equipment mounting panels, each equipment mounting panel comprising:
      opposing side lip portions each having a detent positioned thereon to mate with a respective one of the plurality of discrete openings spaced along the upper mounting lip of the first and second side panels,
      a tongue positioned along a first edge thereof between the opposing side lip portions and sized to mate with the groove of the blank panels,
      a groove positioned along a second edge thereof between the opposing side lip portions opposite from the tongue and sized to mate therewith and with the tongue of the blank panels,
      first and second clamp actuator clearance passages formed between opposing inner and outer surfaces and positioned inwardly of the respective detents and substantially aligned therewith,
      first and second substantially upright projections positioned on the inner surface between the first and second edges and inwardly of respective side lip portions, each projection further comprising a pair of fastener receivers positioned on opposite sides of the respective clamp actuator clearance passage and spaced outwardly thereof along the respective side lip portion and toward the first and second edges, and a clearance notch positioned between the respective clamp actuator clearance passage and detent,
      a cutout positioned between the side lip portions and the first and second edges and sized to receive an equipment piece therethrough; and
   first and second pairs of releasable clamps, each clamp comprising an actuator operable through a respective one of the clamp actuator clearance passages of one of the blank panels and equipment mounting panels, and a jaw portion, each clamp being movable by actuation of the actuator between a clamping position having the jaw portion oriented substantially transverse of and extended over a respective one of the opposing side lip portions with the upper mounting lip of a respective one of the opposing first and second substantially rigid side panels being positioned therebetween, and a release position having the jaw portion spaced inwardly of the respective opposing side lip portion, and wherein in the clamping position the jaw portion is further responsive to actuation of the actuator for moving between a first unclamped state substantially transverse of the respective side lip portion and spaced away therefrom in a position extended thereover, and a second clamped state substantially transverse of the respective side lip portion and adjacent thereto with a portion of the upper mounting lip of the respective first and second side panel clamped therebetween.

9. The console of claim 8 wherein each of the first and second pairs of clamps further comprises a biasing member positioned to urge the jaw portion into the first unclamped state spaced away from the respective side lip portion, and the actuator is further configured to force the jaw portion into the second clamped state adjacent to the respective side lip portion.

10. The console of claim 9 wherein the actuator of each of the first and second pairs of clamps is further configured to compress the biasing member against the inner surface of the equipment mounting panel.

11. The console of claim 10 wherein the actuator of each of the first and second pairs of clamps is further configured to rotate the jaw portion between the clamping position and the release position.

12. The console of claim 11 wherein the first and second substantially upright projections positioned on the inner surface of the equipment mounting panels each further comprises a substantially upright stop portion adjacent to the respective clamp actuator clearance passage; and
  wherein the jaw portion of each of the second pair of clamps is further sized to pass through the clearance notch in a respective one of the first and second substantially upright projections between the clamping and release positions thereof, and is further sized to engage the substantially upright stop portion in each of the clamping position and the release position.

13. The console of claim 12 wherein the actuator of the each of the first and second pairs of clamps further comprises a threaded shaft portion sized to pass through a respective one of the first and second clamp actuator clearance passages in the respective blank panel and equipment mounting panel, and a slotted head portion positioned externally of the outer surface thereof; and
  wherein each of the first and second pairs of clamps further comprises a bore having the actuator shaft passing therethrough and the biasing member being compressible therein, and a threaded portion substantially aligned with the bore and threadedly mated with the threaded shaft portion of the actuator.

14. The console of claim 13 wherein each of the first and second pairs of clamps further comprises a socket substantially aligned with the bore, and a clearance passage substantially aligned with the bore and a counterbore and communicating therebetween and having a portion of the actuator shaft passing therethrough; and
  wherein the threaded portion of each of the first and second pairs of clamps further comprises an internally threaded nut at least partially retained within the socket of the respective one of the clamps and substantially constrained from rotation therein.

15. The console of claim 11 wherein one of the opposing first and second substantially rigid end panels further comprises a tongue positioned along an edge thereof between the opposing side lip portions and sized to mate with the groove of the blank and equipment mounting panels, and an other one of the end panels further comprises a groove positioned along an edge thereof between the opposing side lip portions and sized to mate with the tongue of the blank and equipment mounting panels.

16. The console of claim 15, further comprising a plurality of substantially rigid L-brackets each comprising a substantially rigid equipment interface portion and a substantially rigid panel interface portion substantially rigidly interconnected by a substantially rigid right angle portion forming a substantially right angle therebetween, wherein the equipment interface portion further comprises a plurality of substantially parallel equipment interface slots oriented substantially perpendicularly of the right angle portion, and wherein the panel interface portion further comprises a pair of panel interface slots oriented substantially perpendicularly of the right angle portion and positioned to substantially align with the pair of fastener receivers of the substantially upright projections positioned on the inner surface of the equipment mounting panel and further comprising a plurality of substantially parallel grooves scoring a surface of the panel interface portion at substantially regular intervals between the right angle portion and an outer end of the panel interface portion distal from the right angle portion.

17. A reconfigurable vehicle console, comprising:
  opposing first and second substantially rigid end panels, the first end panel being formed with a tongue along an inwardly facing edge thereof, and the second end panel being formed with a groove along an inwardly facing edge thereof and sized to receive the tongue thereinto;
  opposing first and second substantially rigid side panels spaced apart by the first and second end portions of the side panels substantially rigidly interconnected therewith, each side panel comprising a plurality of fastener passages, and further comprising a substantially rigid upper mounting lip each facing the opposing side panel and being formed with a plurality of notches substantially evenly spaced along an inner edge thereof;
  a plurality of substantially rectangular removable blank panels, each blank panel comprising:
    a substantially planar outer surface and an opposing inner surface,
    opposing side lip portions each having a detent positioned thereon to mate with a respective one of the plurality of notches spaced along the upper mounting lip of the first and second side panels,
    a tongue positioned along a first edge thereof between the opposing side lip portions and sized to be received into the groove of the first end panel,
    a groove positioned along a second edge thereof between the opposing side lip portions opposite from the tongue and sized to receive thereinto the tongue of the second end panel, and
    first and second clamp actuator clearance passages formed between the opposing inner and outer surfaces and positioned spaced inwardly of the respective detents and substantially in alignment therewith;
  a plurality of first pairs of releasable clamps, each of the clamps comprising an actuator operable through a respective one of the clamp actuator clearance passages of one of the blank panels, and a jaw portion, each clamp being movable by actuation of the actuator between a clamping position having the jaw portion oriented substantially transverse of and extended over a respective one of the opposing side lip portions with the upper mounting lip of a respective one of the opposing first and second substantially rigid side panels being positioned therebetween, and a release position having the jaw portion spaced inwardly of the respective opposing side lip portion, and wherein in the clamping position the jaw portion is further responsive to actuation of the actuator for moving between a first unclamped state substantially transverse of the respective side lip portion and spaced away therefrom in a position extended thereover, and a second clamped state substantially transverse of the respective side lip portion and adjacent thereto with a portion of the upper mounting lip of the respective first and second side panel clamped therebetween;
  a plurality of substantially rectangular removable equipment mounting panels, each equipment mounting panel comprising:
    a substantially planar outer surface and an opposing inner surface,
    opposing side lip portions each having a detent positioned thereon to mate with a respective one of the plurality of notches spaced along the upper mounting lip of the first and second side panels,
    a tongue positioned along a first edge thereof between the opposing side lip portions and sized to mate with the groove of the first end panel,
    a groove positioned along a second edge thereof between the opposing side lip portions opposite from the tongue and sized to mate with the tongue of the second end panel,
    first and second clamp actuator clearance passages formed between the inner and outer surfaces and positioned inwardly of the respective detents and substantially in alignment therewith, first and second substantially upright projections positioned on the inner surface between the first and second edges and inwardly of respective side lip portions, each projection further comprising a pair of fastener receivers positioned on opposite sides of the respective clamp actuator clearance passage and spaced outwardly thereof along the respective side lip portion and toward the first and second edges, and a clearance notch positioned between the respective clamp actuator clearance passage and detent, a cutout communicating between the opposing inner and outer surfaces and positioned between the side lip portions and the first and second edges and sized to receive an equipment piece therethrough; and a plurality of second pairs of releasable clamps, each of the clamps comprising an actuator operable through a respective one of the clamp actuator clearance passages of one of the equipment mounting panels, and a jaw portion, each clamp being movable by actuation of the actuator between a clamping position having the jaw portion oriented substantially transverse of and extended over a respective one of the opposing side lip portions with the upper mounting lip of a respective one of the opposing first and second substantially rigid side panels being positioned therebetween, and a release position having the jaw portion spaced inwardly of the respective opposing side lip portion, and wherein in the clamping position the jaw portion is further responsive to actuation of the actuator for moving between a first unclamped state substantially transverse of the respective side lip portion and spaced away therefrom in a position extended thereover, and a second clamped state substantially transverse of the respective side lip portion and adjacent thereto with a portion of the upper mounting lip of the respective first and second side panel clamped therebetween.

18. The console of claim 17 wherein the actuator of each of the clamps is further configured to rotate the jaw portion between the clamping position and the release position.

19. The console of claim 18 wherein each of the blank panels and equipment mounting panels further comprises a substantially rigid stop portion positioned on the inner surface thereof adjacent to the respective clamp actuator clearance passage;

wherein each of the clamps further comprises a biasing member positioned between jaw portion thereof and the inner surface of the respective blank and equipment mounting panel for urging the jaw portion into the first unclamped state;

wherein the actuator of the each of the clamps further comprises a threaded shaft portion sized to pass through a respective one of the first and second clamp actuator clearance passages in the respective blank panel and equipment mounting panel, and a head portion positioned externally of the outer surface thereof; and wherein the jaw portion of each of the clamps is further sized to engage the substantially rigid stop portion in each of the clamping position and the release position.

20. The console of claim 19 wherein each of the clamps further comprises a body portion comprising the jaw portion thereof, the body portion further comprising a bore therein having the actuator shaft passing therethrough and the biasing member being compressible therein, and a threaded portion substantially aligned with the bore and threadedly mated with the threaded shaft portion of the actuator.

* * * * *